United States Patent [19]
Hackenberg

[11] Patent Number: 5,134,003
[45] Date of Patent: Jul. 28, 1992

[54] HOLLOW CYLINDRICAL STRUCTURAL MEMBER OF FIBER REINFORCED RESIN

[75] Inventor: Rudolf Hackenberg, Langerwehe-Jüngersdorf, Fed. Rep. of Germany

[73] Assignee: Uranit GmbH, Jülich, Fed. Rep. of Germany

[21] Appl. No.: 759,883

[22] Filed: Sep. 13, 1991

[30] Foreign Application Priority Data

Jan. 14, 1991 [DE] Fed. Rep. of Germany ....... 4100816

[51] Int. Cl.$^5$ ................................................ B32B 1/08
[52] U.S. Cl. ................................... 428/36.3; 156/175; 428/34.1; 428/192; 428/408; 428/902
[58] Field of Search .................. 428/34.1, 36.3, 192, 428/408, 902; 156/175

[56] References Cited

U.S. PATENT DOCUMENTS

| | | | |
|---|---|---|---|
| 4,172,562 | 10/1979 | Smith | 156/175 |
| 4,359,356 | 11/1982 | Hornbichler et al. | 156/175 |
| 4,470,860 | 9/1984 | Gill et al. | 156/175 |
| 4,701,231 | 10/1987 | Peters et al. | 156/175 |

*Primary Examiner*—James J. Bell
*Attorney, Agent, or Firm*—Klaus J. Bach

[57] ABSTRACT

In a hollow cylindrical structural member consisting of resin impregnated fibers wound in alternate layers of circumferential and helical windings disposed on top of one another and having reinforcing support ring structures formed at its axial ends by additional circumferential windings, the additional windings include inner and outer layers of windings of different strength fibers wherein the fibers of the outer layers have a modulus of elasticity which is smaller than that of the fibers of the inner fiber layers so that, particularly for use with high speed rotors, the centrifugal forces do not cause separation between outer and inner layers.

5 Claims, 2 Drawing Sheets

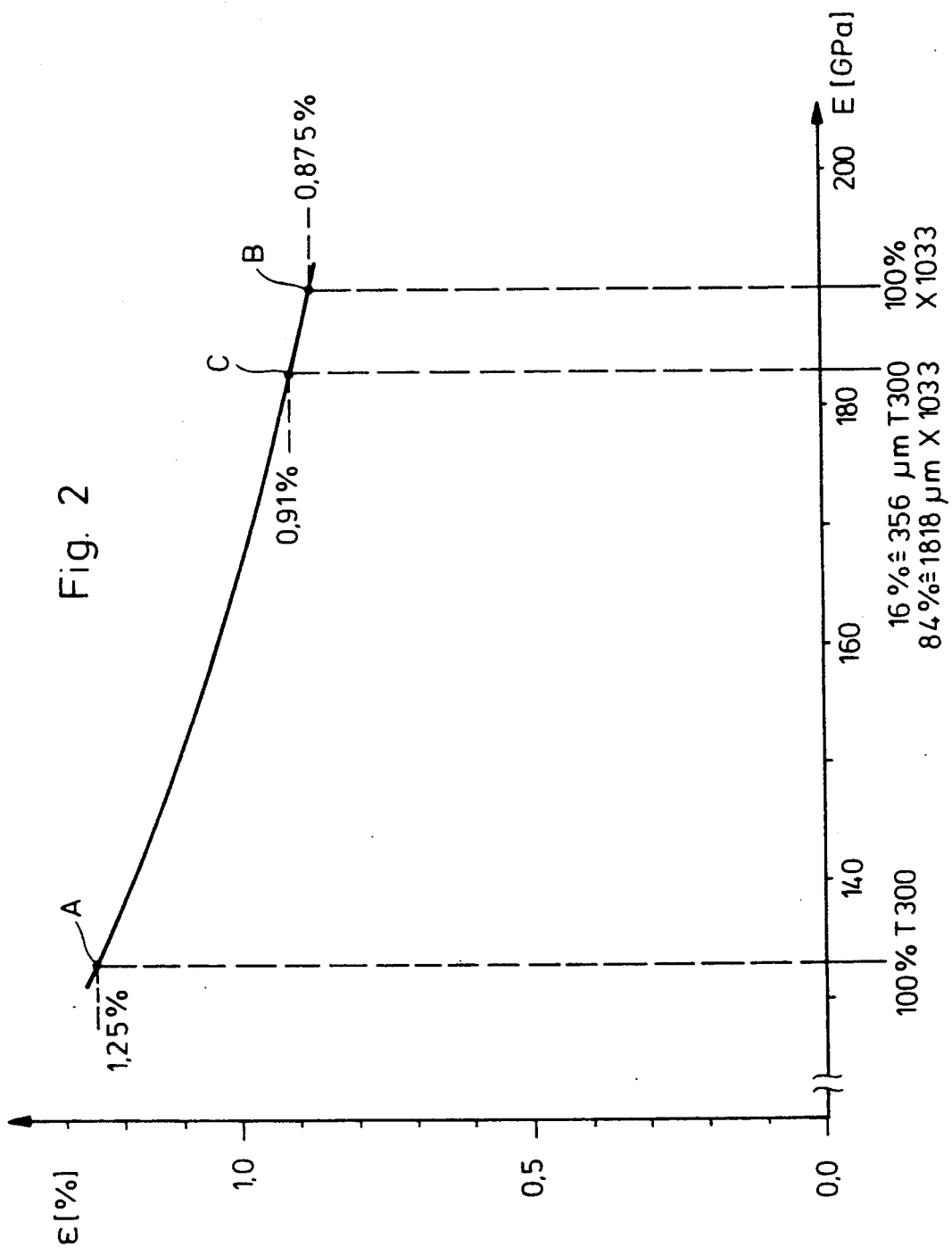

HOLLOW CYLINDRICAL STRUCTURAL MEMBER OF FIBER REINFORCED RESIN

BACKGROUND OF THE INVENTION

The invention relates to a hollow cylindrical structural member consisting of fiber reinforced resin for high speed rotors including alternate fiber layers of circumferential windings and helical windings disposed on top of one another and reinforced by additional circumferential windings at the axial ends which provide support ring structures.

The manufacture and design of such components is described and shown in U.S. Pat. No. 4,359,356. The patent discloses a winding machine capable of winding more than one member at the same time. After winding, the wound body is cut apart in the area of the support ring structures thereby to form the separate components which can be interconnected by corrugated tubular connecting elements to form a rotor. The admissible circumferential speed of such rotors depends, among others, on the tensile strength of the fibers utilized. Carbon fibers (C-fibers) with extremely high tensile fracture strength of up to 7000 MPa are therefore used for the circumferential wingings. It has been found however that the high tensile strength of these fibers cannot be fully utilized since, with increased circumferential rotor speeds and correspondingly increased circumferential tension of the rotor, there is an increased possibility of winding separation or dislodgement. This dislodgement or separation of fiber layers usually beings with the outermost fiber layers at the axial ends of the cylindrical members.

It is the principal object of the present invention to provide such structural cylindrical members in such a manner that they are not subject to layer separation so that, with the use of fibers with extremely high tensile strength, the circumferential speed of such structural members can be increased without detrimental effects.

SUMMARY OF THE INVENTION

In a hollow cylindrical structural member which consists of resin impregnated fibers wound in alternate layers of circumferential and helical windings disposed on top of one another and has reinforcing support ring structures formed at its axial ends by additional circumferential windings including inner and outer layers of different strength fibers, the fibers of the outer fiber layers have a modulus of elasticity which is smaller than that of the fibers of the inner fiber layers thereby to prevent separation of the outer fiber layers from the body of the member.

Such members are particularly suitable for use in high speed rotors where high centrifugal forces and correspondingly high circumferential stresses have caused separation and dislodgement of the outer layers of such structural members.

It has been found that the tendency for dislodgement is caused generally by the high sensitivity to shear and tangential stress sensitivity of high strength fiber reinforced compounds, which sensitivity is particularly apparent in the outer circumferential layers and at the end faces or separation edges of the components. Increased circumferential speeds however do not only result in increased circumferential tensions but also in increased shear and tangential stresses. If the high strength C-fibers are replaced in a thin outer layer by medium strength C-fibers which also have a lower shear and tangential stress sensitivity, the shear and tangential stress strength of the affected outer layer is increased while the high strength fiber layers in the main support areas are retained. With such an arrangement, circumferential expansion of the components is only slight and the lower modulus of elasticity of the fibers of medium strength provides for lower loading of the outer layers. The thickness of the outer fiber layer with the fibers with a relatively low modulus of elasticity is about 10% to 20% of the fiber layer thickness of the inner fiber layers of the support ring disposed beneath. The elasticity modulus of the fibers in the outer layer is about 25% lower than that of the inner fiber layers below the outer layers. Preferably medium strength C-fibers are used for the outer layer and high strength C-fibers are used for the inner layers. Before winding the fibers are impregnated with a resin that is hardened after the winding procedure.

BRIEF DESCRIPTION OF THE DRAWINGS

FIG. 1b is a greatly enlarged view of the section X of FIG. 1a; and

FIG. 2 shows a diagram giving the radial expansion $\epsilon$ of the component on the basis of the medium elasticity modulus E of all layers.

DESCRIPTION OF THE PREFERRED EMBODIMENT

Figure 1A:
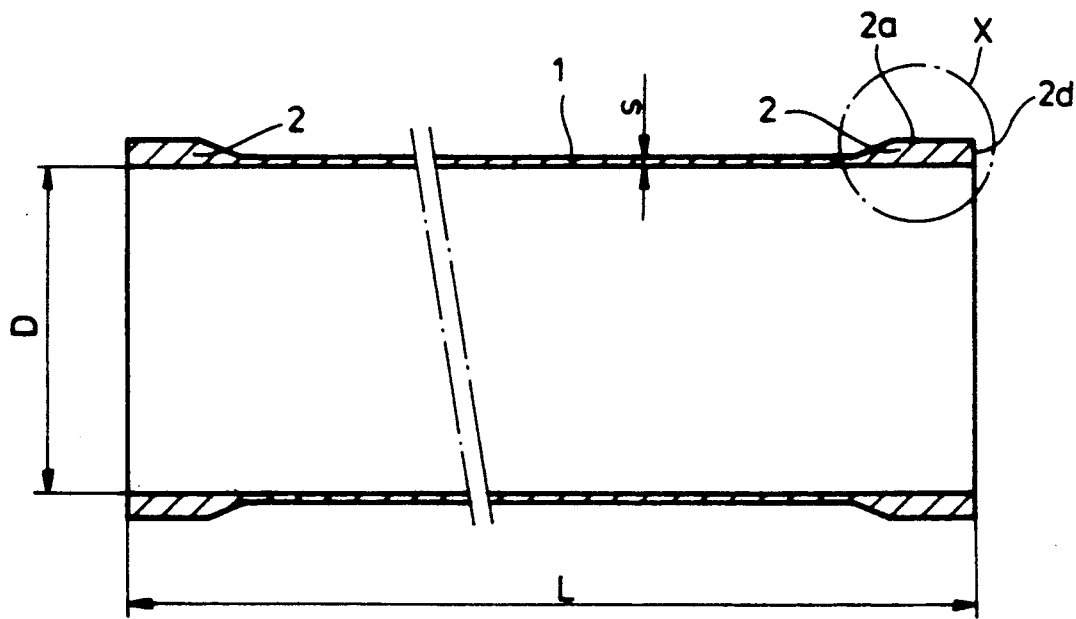
FIG. 1a is a schematic cross-sectional view of a hollow cylindrical component with support rings at the end faces.
Figure 1B:
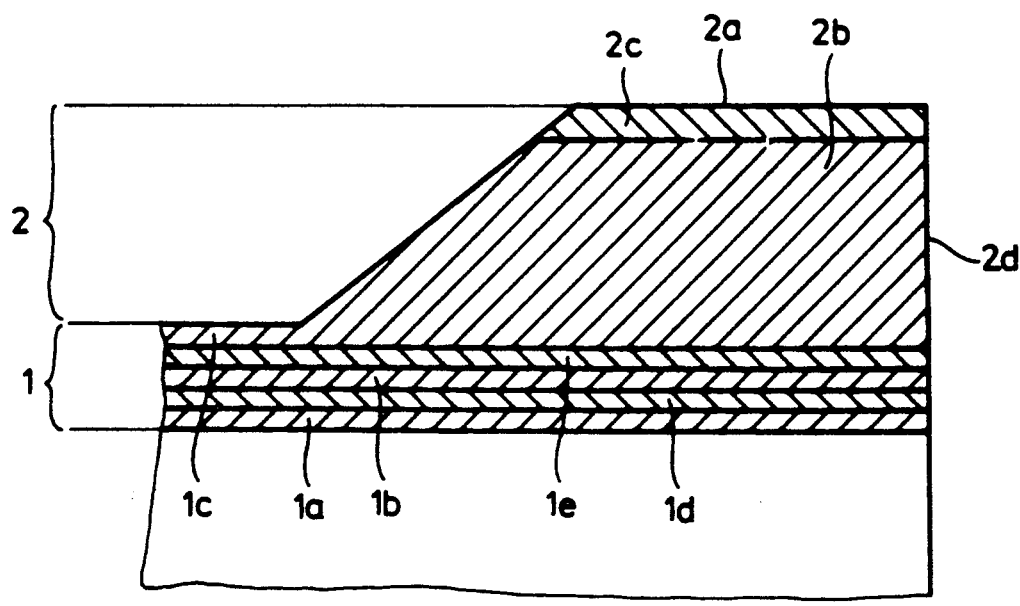

The cylinder 1 consists of several fiber layers having alternate fiber layers of circumferential windings 1a, 1b, 1c and fiber layers of helical windings 1d, 1e disposed on top of one another. The fibers are resin-impregnated high strength C-fibers which are commercially available under the designation "T800" ($\sigma B=5500$ MPa, Ep=285 GPa) or X1033 ($\sigma B=6000$ MPa, Ep=330 GPa). The thickness of the fiber layers 1a, 1b, 1c, 1d and 1e is about 140 $\mu$m.

The support ring 2 includes only circumferential windings. It has conical inner ends with cylindrical portions 2a disposed at the outer ends and an axial length of about 30 mm.

The axial end is formed by a cutting edge 2d, which extends normal to the cylindrical surface of the component. The inner layer 2b of the support ring 2 also consists of high strength "T800" or "X1033" C-fibers and has a thickness of 1818 $\mu$m. The outer fiber layer 2c wound thereon consists of medium strength C-fibers, commercially available under the designation "T300" ($\sigma B=3500$ MPa, Ef=230 GPa). This outer layer 2c has a thickness of 356 $\mu$m.

The diagram of FIG. 2 shows a curve indicative of the relation between the expansion $\epsilon$ and the medium elasticity modulus E for a particular constant circumferential tension $\sigma$ of the component which is a resin impregnated fiber structure comprising the fibers and the resin. It is pointed out that the elasticity module of such structures is substantially smaller than the elasticity module of the fibers alone so that the values given in FIG. 2 for 100% T300 and 100% X1033 are substantially lower than those given above for the fibers alone. It is also noted that the elasticity module of carbon fibers is stress dependent. The figure shows an elasticity module for a stress of 50% of its tensile fracture strength. Point A indicates the expansion if 100% T300 fibers are used: point B indicates the expansion if 100% X1033 fibers are used. Point C gives the expansion $\epsilon$ for an arrangement utilizing for the thin outer layer 2c T300 fibers and for the thicker inner layer 2c X1033 fibers wherein the content of T300 fibers is about 16% and the content of X1033 fibers is about 84% of the component. As can be seen the total expansion $\epsilon$ at point C is increased only by a small amount in comparison with point B. In contrast the elasticity modulus E in the outer layer (point A) is substantially smaller. Since the tension $\sigma = \epsilon \times E$, it is quite readily apparent that, as a result of the lower elasticity modulus of the T300 fibers, the outer layer carries a smaller load while the medium elasticity modulus for the whole layer differs only slightly from the elasticity modulus for the X1033 fiber (point B). This means that the main load is still carried by the inner layer 2b; the outer layer 2c as a result of the lower loadings and the higher tensional shear strength serves in a way as a protective layer particularly in the area of the cutting edge 2d where the component is especially sensitive consists of high strength carbon fibers.

What is claimed is:

1. A hollow cylindrical structural member consisting of fiber reinforced resin, particularly for use in high speed rotors, said structural member comprising alternate layers of circumferential and helical windings disposed on top of one another and having formed at its axial ends reinforcing support ring structures including additional circumferential windings, said additional windings consisting of an inner layer of fibers and an outer layer of fibers disposed on top of said inner layer of fibers, the fibers of said outer fiber layer having a modulus of elasticity which is smaller than that of the fibers of said inner fiber layer.

2. A structural member according to claim 1, wherein the thickness of said outer layer of fibers with the lower modulus of elasticity is 10% to 20% of said inner layer of fibers disposed below said outer fiber layer.

3. A structural member according to claim 1, wherein the modulus of elasticity of the fibers of said outer layer is about 25% lower than the modulus of elasticity of the fibers forming said inner layer of fibers.

4. A structural member according to claim 2, wherein the modulus of elasticity of the fibers of said outer layer is about 25% lower than the modulus of elasticity of the fibers forming said inner layer of fibers.

5. A structural member according to claim 1, wherein the fibers of said outer layer of fibers consist of carbon fibers of medium tensile strength and the fibers in said inner layer are surrounded by said medium strength outer fiber layer.

* * * * *